INVENTOR.
RALPH C. ROE

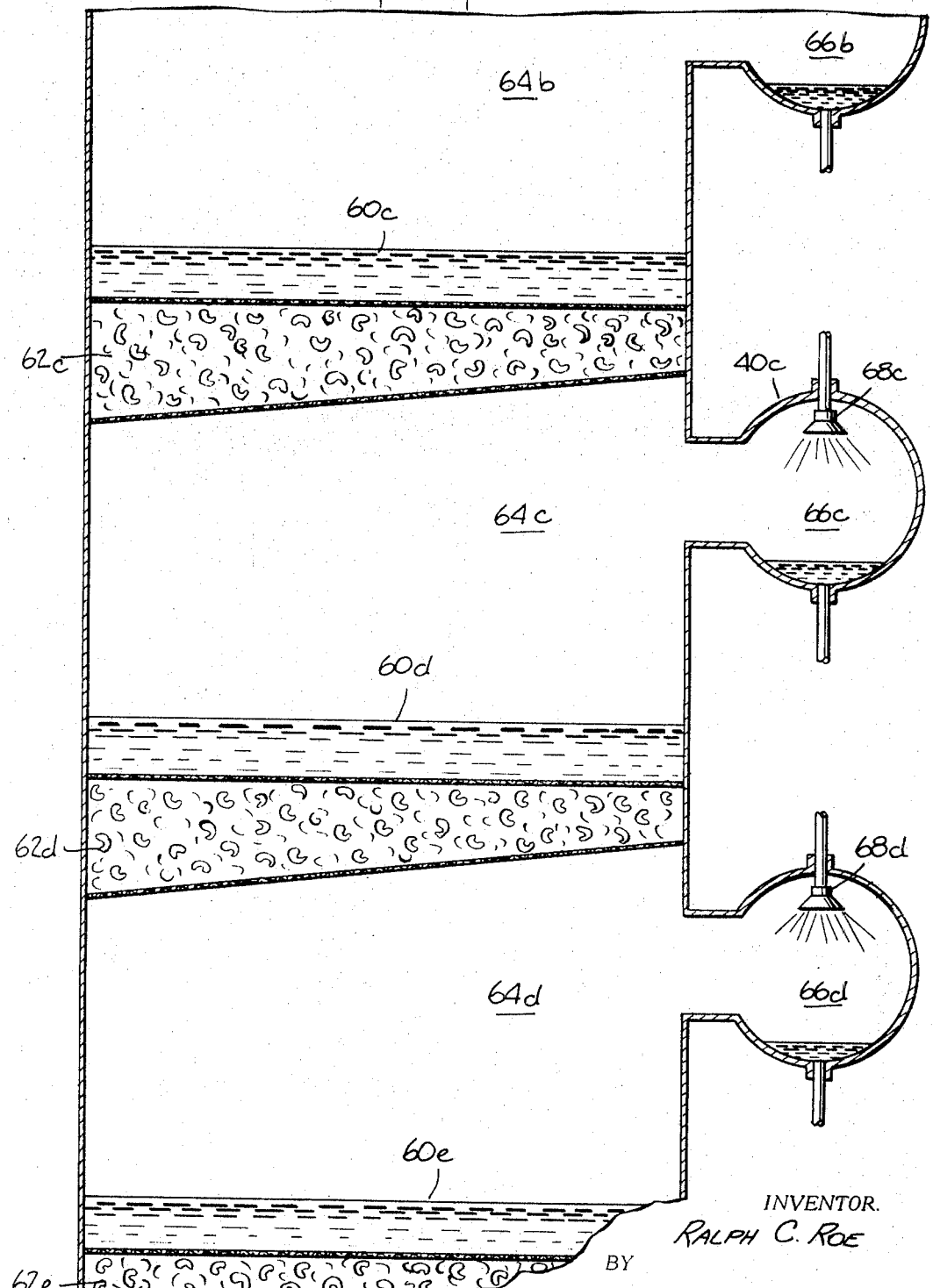

3,438,202
CONDENSING POWER PLANT SYSTEM
Ralph C. Roe, Tenafly, N.J., assignor to Saline Water Conversion Corporation, Oradell, N.J., a corporation of New York
Filed Oct. 27, 1967, Ser. No. 678,732
Int. Cl. F01k 7/34, 7/22; F22d 11/00
U.S. Cl. 60—64         18 Claims

ABSTRACT OF THE DISCLOSURE

A steam power plant consisting of a boiler, prime mover and main surface condenser with the necessary inter-connecting piping and accessory apparatus, which surface condenser condenses substantially all the steam passing through the prime mover into condensate in co-operation with an evaporative recovery system for providing fresh water as well as makeup water for said power plant system. The evaporative recovery system includes a multi-stage evaporator type water recovery unit which carries out water vapor condensation by direct contact of water vapors produced from saline water with the condensate from said surface condenser being returned to the boiler. Said saline water being initially preheated through heat exchangers with bled steam from said prime mover.

---

Figure 1:
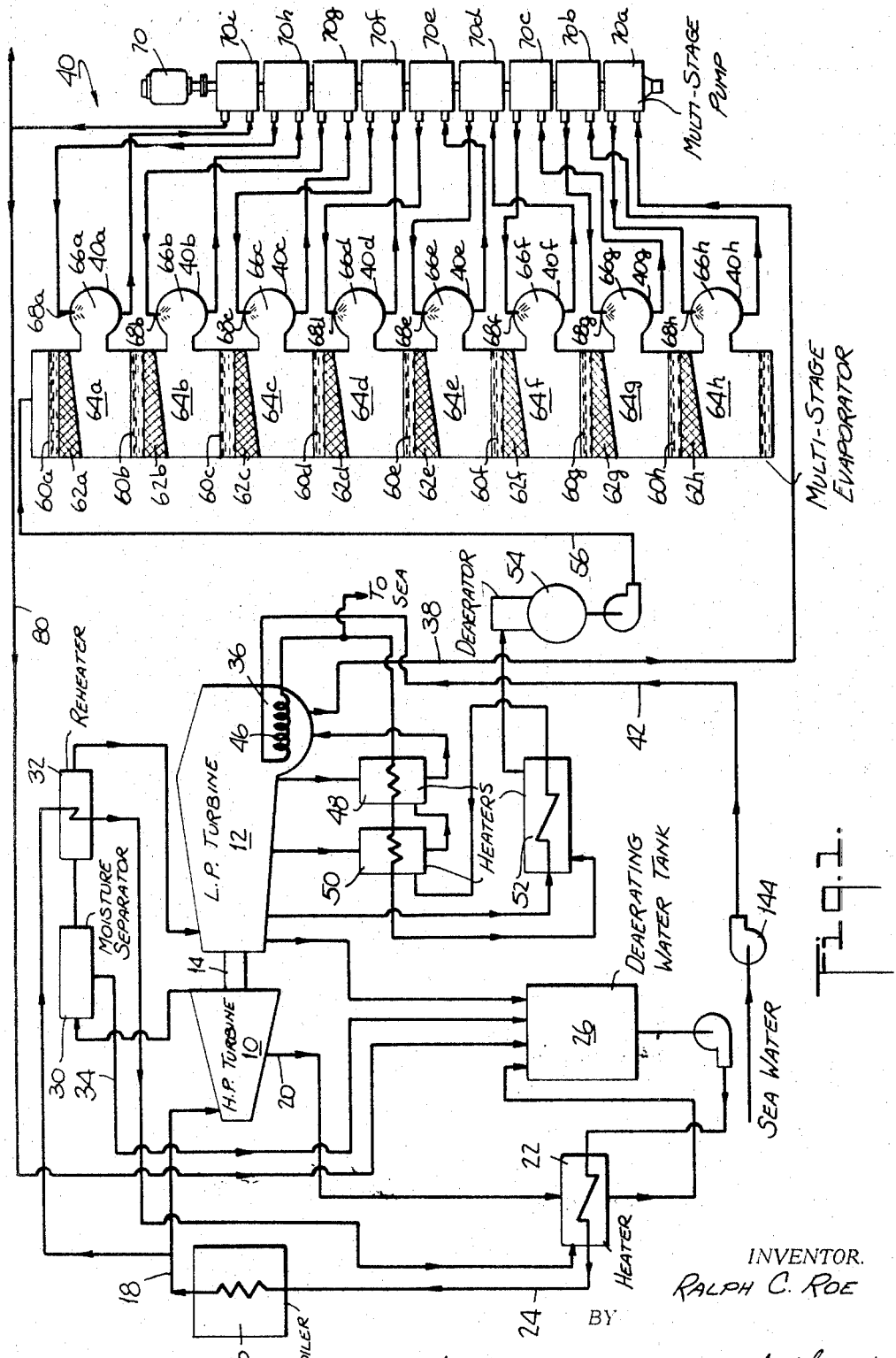

This invention relates to the processing of fluids and more particularly it concerns novel arrangements for using excess heat from condensing power plants to operate evaporative recovery systems.

The present invention makes possible effective use of the low grade heat from a steam power plant to extract fresh water from sea water. It has long been recognized that the heat output of a steam power plant, which represented waste energy, was potentially capable of powering sea water desalinization systems. However, prior attempts to provide an integrated power plant and desalinization system have not been entirely satisfactory. In general, the equipment necessary to produce a given fresh water output was complex and expensive. Moreover, because of the multiple heat transfer barriers imposed by the fluid separating walls in the various heat exchangers involved, a great amount of the theoretically available heat from the power plant could not be utilized.

The present invention overcomes these problems of the prior art. With the present invention it is possible to make far greater use of the heat energy supplied from the steam power plant in the desalinization of sea water. Moreover, the equipment required to integrate the power plant and desalinization operations according to the present invention is relatively simple and inexpensive.

The present invention makes use of the condensate in a power plant as a direct contact condensing medium. Although the cooling water from a condenser has previously been proposed as a heat source for obtaining fresh water from saline water, it has not been previously proposed to use condensate from a power plant as the condensing means by direct contact in multi-stage evaporation units.

The present invention involves a steam power plant in which water is first converted to steam in a boiler. This steam is then passed through a prime mover such as a turbine and thereafter is condensed again to liquid form. The condensate thus formed is passed through an evaporative recovery system where it serves as a direct contact fresh water conednsing medium. In the recovery system, the flow rate of power plant condensate increases due to its direct contact condensing function. This additional quantity of condensate serves to provide make-up water for the power plant; and it further serves as a source of additional fresh water which can be tapped off for other use.

The steam power plant also serves to preheat the saline water to a temperature sufficient to cause its vaporization in the evaporative recovery system. The saline water may be heated both in the main surface condenser of the steam power plant and in heat exchangers fed with steam bled from the prime mover or turbine.

Further specific features and advantages of the invention will be hereinafter more fully set forth with reference to the annexed drawings, showing a presently preferred embodiment of the invention and certain modifications thereof, in which:

FIG. 1 is a schematic diagram of an integrated steam power plant and sea water desalinization system embodying the present invention; and FIG. 2 is an enlarged detail view of a typical stage of the desalinization system of FIG. 1.

The integrated system shown in FIG. 1 includes a steam turbine arrangement comprising a high pressure turbine 10 and a low pressure turbine 12 each connected to a common shaft 14.

A boiler 16 is provided to supply fresh steam via a main steam line 18 to the inlet of the high pressure turbine 10. This steam expands during its passage through the high pressure turbine 10 and a part of its thermal energy is converted in the turbine to mechanical work. A small portion of the steam passing through the high pressure turbine 10 is extracted from an intermediate tap 20 and is directed through a high pressure stage heater 22 where it gives up heat to liquid water in a boiler feed line 24. The steam from the heater 22 then passes through a deaerating water tank 26 where it is condensed and mixed with other water to be fed to the boiler. This boiler feed water is pumped from the deaerating water tank 26 by means of a pump 28 interposed in the boiler feed line 24 ahead of the high pressure stage heater 22.

The exhaust from the high pressure turbine 10 is directed through a moisture separator 30 and a reheater 32; and from there it is supplied to the inlet of the low pressure turbine 12. The moisture separator 30 removes any liquid particles which may be present in the exhaust of the high pressure turbine stage. These moisture particles are delivered via a moisture return line 34 to the deaerating water tank 26.

The reheater 32 supplies additional heat energy to steam entering the low pressure turbine 12. For this purpose it receives fresh steam from the main steam line 18 and places it in heat exchange relationship with the steam to the low pressure turbine 12. The spent steam from the reheater 32 is then directed into the high pressure stage heater 22 where it assists in heating incoming boiler feed water.

The steam which is supplied to the low pressure turbine 12 expands therein as the major portion of its thermal energy is converted to mechanical work by the turbine. Upon exhaustion from the low pressure turbine 12 the steam passes through a main condenser 36 where it is converted into liquid condensate. The liquid condensate is then transferred via a condensate line 38 to a desalinization system shown generally at 40.

The main condenser 36 receives sea water via a coolant input line 42 from a coolant supply pump 44. This sea water passes through tubes 46 inside the condenser where it absorbs heat from the spent low pressure turbine steam and converts it to liquid condensate. In this process, the coolant sea water becomes partially heated. That portion of it required for desalinization feed then passes successively through first, second and third stage heaters 48, 50 and 52 where it is further heated to a temperature at which desalinization may commence. It is then passed through a deaerator 54 which removes noncondensable gases from the heated brine solution. The brine is then pumped through a brine supply line 56 to the desalinization system 40.

The heaters 48, 50 and 52 each receive steam tapped off from different intermediate stages of the low pressure turbine 12. This steam is used to heat the saline water passing through the heater; and after performing this function, the condensed steam is then passed into the next lower stage heater to assist the brine heating action there. The steam thus used is then in the form of hot condensate passed to the main condenser 36 where it is cooled by the incoming sea water circulated through the tubes 46.

The desalinization system 40 is made up of a plurality of stages, 40a–h, arranged in vertical alignment. A typical stage is shown in FIG. 2. The operating principles of these stages are described in detail in U.S. Patents No. 3,214,350 and 3,330,739. Each stage includes an upper liquid reservoir 60a–h, a vaporization region 62a–h and a vapor separation region 64a–h. The pressure in each upper liquid reservoir 60 is maintained close to the saturation pressure of the liquid resting therein while the pressure in each vapor separation region 64 is at a lower level.

Each vaporization region 62 is constituted of a plurality of narrow channels which extend between the associated liquid reservoirs 60 and the associated vapor separation region 64. These channels may be formed in any of several ways, a preferred way being the use of a mass of aggregate material such as random shaped pieces of porcelain, etc. with the channels being formed by the interstices remaining between the individual particles.

As the brine solution passes through each vaporization region 62 it experiences pressures below its saturation pressure and accordingly undergoes partial vaporization. This vaporization is accompanied with volumetric expansion and the vapors in moving rapidly downwardly through the channels set up a pressure gradient along the length of each channel. This pressure gradient ensures that the vaporization will occur gradually and smoothly along the channel length. Thus, although the evaporation is achieved by the basic "flash" process, the gradation of pressure charge along the length of each channel in the vaporization regions 62 prevents the violence normally associated with "flash" type evaporation. At the same time the advantages of flash evaporation are preserved. That is, the vapors receive their latent heat directly from the associated liquid and not through any heat transfer barriers.

Each individual stage of the desalinization system 40 also includes a condenser region 66a–h which communicates directly with the vapor separation regions 64. The condenser regions 66 make use of direct contact condensation; and for this purpose there are provided spray nozzles 68a–h at the top of each condenser region. These spray nozzles supply a spray of purified coolant water which rains down through the condenser region. In the course of raining down through the condenser regions 66, the coolant droplets cause condensation thereon of some of the vapors in the region. The resulting condensate thus increases the volume of the coolant water.

In the overall system, heated brine from the brine supply line 56 is passed into the liquid reservoir 60 of the first or uppermost stage 40a of the desalinization system 40. This brine passes down through the vaporization reservoir 62 where a portion of it becomes vaporized. The remaining unevaporated brine then passes down through vapor separation region 64 and into the liquid reservoir 60 of the second stage 40b wherein the process is repeated.

It will be appreciated that since the heat of vaporization in each stage is acquired from the unevaporated liquid in the stage, the temperatures within the system decrease from top to bottom. Additionally, in order to achieve vaporization at these lower temperatures, the pressure in each stage must be lower than that in the next higher stage.

The liquid condensate produced in the main condenser 36 and supplied via the condensate line 38 is passed through a first stage 70a of a multistage pump 70; and from there it flows into the condenser region 66 of the lowermost desalinization stage 40h. This liquid condensate, which enters the condenser region 66 via its nozzles 68, serves as a direct contact condensing fluid; and as it liquifies the vapors in the condenser region, it increases in volume. The liquid which accumulates in the bottom of the lower stage condenser region 66h is then pumped by a second stage 70b of the pump 70 into the condenser region of the next higher desalinization stage 40g where it enters via the spray nozzles 68.

The condensate liquid thus passes upwardly through the desalinization system 40 via the various stages of the pump 70. The pump 70, it will be appreciated, serves to bring the condensing liquid up to the higher pressure of the next higher stage in which it is to be used. This permits the condensing fluid to flow into and through the higher pressure stages of the system.

Upon completion of its passage through the fisrt stage condenser region 66a, the coolant fluid passes through the uppermost stage 70i of the pump 70 and thence via a feedwater return line 80 down into the deaerating water tank 26 for return to the boiler 16.

During operation of the overall system water passes through the boiler 16 where it is converted to steam. A major portion of this steam passes successively through the high and low pressure turbines 10 and 12 where it expends most of its heat energy in doing mechanical work. The exhausted steam is thus condensed in the man condenser 36 and then pumped upwardly through the desalinization system 40 by the multistage pump 70. During its passage through the desalinization system 40 the liquid condensate from the main condenser 36 itself acts as a condensing medium; and because it employs a direct contact condensing principle, it increases in volume as the vapors in the desalinization system condense on it. The liquid condensate is then returned to the boiler 16, however, any excess volume is tapped off as product water via a product output line 82.

While the fresh water recirculates through the boiler 16, turbines 10 and 12, condenser 36 and desalinization system 40, saline water or brine passes through cooling tubes 46 of the main condenser 36 and then a portion of it passes through the various heater stages 48, 50 and 52 when it becomes heated to a temperature sufficient to become at least partially evaporated in the desalinization system 40. This heated brine is supplied to the upper end of the desalinization system and flows freely down through its various stages, experiencing pressure and temperature drops as more and more of its heat is used in the generation of vapors. The resdiue or unevaporated brine at the lower end of the desalinization system 40 is returned to the sea via a residue return line 84.

It will be appreciated that above described system very closely integrates the operations of a steam condensing power plant and a desalinization system. The heat available from the power plant is given up to the brine or sea water which requires this heat for vaporization.

In the desalinization system, the use of "controlled flash" evaporation and direct contact condensation serve to provide maximum efficiency in the recovery of fresh water from brine since all interfluid heat transfer barriers are eliminated. As can be seen, this is achieved by using the same fluid which recirculates through the power plant as the condensing medium in the desalinization system.

Having described my invention with particularity with reference to the preferred embodiment of the same, and having referred to some of the possible modifications thereof, it will be obvious to those skilled in the art, after understanding my invention, that other changes and modifications may be made therein without departing

What I claim is:

1. In combination, a fluid condensing power plant system, an evaporative recovery system of the type which utilizes direct contact condensation, conduit means arranged to direct a solution having said fluid as a component to be heated in said power plant system, further conduit means arranged to direct said solution into said evaporative recovery system for evaporation and recovery of said fluid component, and still further means directing the condensate of said power plant system through said evaporative recovery system for condensing vapors therein.

2. In combination, a steam condensing power plant system, an evaporative recovery system for providing essentially fresh water, means for supplying a solution having fresh water as a component and for heating said solution in said power plant system, conduit means directing said heated solution into said evaporative recovery system for evaporation and recovery of the fresh water contained therein, and means for directing the condensate of said power plant system through said evaporative recovery system for condensing vapors therein.

3. The combination as in claim 2 wherein said solution is saline in nature.

4. In combination, a fluid condensing power plant system, an evaporative recovery system for providing make-up fluid for said fluid condensing power plant system, means for supplying a solution having said fluid as a component and for heating said solution, conduit means to direct said heated solution to the evaporative recovery system to be vaporized therein, and means for directing the condensate of said power plant system through said evaporative recovery system for condensing the vapors therein.

5. The combination as in claim 4 wherein the evaporative recovery system includes a multi-stage evaporative recovery unit wherein condensation is achieved by direct contact of the vapors therein and the condensate supplied thereto.

6. The combination as in claim 5 wherein said fluid is essentially fresh water.

7. In a steam condensing power plant system including the serial cooperation of a steam generator, a turbine and a main condenser, an evaporative recovery system for providing essentially fresh water comprising an evaporator type fresh water recovery unit, a source of saline water, means connected in thermal cooperation with said main condenser for heating said saline water, conduit means for directing a portion of the heated saline water to said fresh water recovery unit to be vaporized therein, means for directing the condensate of said power plant system through said fresh water recovery unit for condensing the vapors therein, and means for collecting the condensed vapors to provide essentially fresh water.

8. The combination as in claim 7 wherein the recited means to heat the saline water is additionally thermal-coupled to said turbine.

9. The combination as in claim 7 wherein condensation of the vapors in the fresh water unit is achieved by direct contact of the vapors therein and the condensate supplied thereto.

10. In a steam condensing power plant system including the serial cooperation of a steam generator, a turbine and a main condenser, an evaporative recovery system for providing make-up water for said condensing power plant system comprising: a multi-stage evaporator type water recovery unit utilizing direct contact condensation, a source of saline water, first means connected in thermal-cooperation with said main condenser for heating said saline water, conduit means for directing a portion of the heated saline water to said multi-stage evaporator type water recovery unit so as to form water vapors in each stage thereof, second means for directing the condensate of said condensing power plant system through each stage of said multi-stage evaporator type water recovery unit for condensing water vapors in each by direct contact of said condensate and said water vapors and third means for collecting the condensed water vapor in each stage to provide said make-up water.

11. The evaporative recovery system as set forth in claim 10 wherein each stage of said multi-stage evaporator type water recovery unit includes a saline water reservoir region, a water vaporization region and a water vapor separation region, the pressure in said water vapor separation region being maintianed at a pressure lower than the saturation pressure of the saline water in said reservoir region.

12. In a steam condensing power plant system including the serial cooperation of a steam generator, a turbine and a main condenser, an evaporative recovery system for providing make-up water for said condensing power plant comprising: a multi-stage evaporator type water recovery unit which utilizes direct contact condensation, each stage including a saline water reservoir region, a water vapor separation region maintained at a pressure lower than the saturation pressure of the saline water in said reservoir region and a water vaporization region, said vaporization region including a channel which sets up a gradual pressure along the length thereof for ensuring that vaporization will occur gradually and smoothly along the length of said channel, a source of saline water, first means connected in thermal-cooperation with said main condenser for heating said saline water, conduit means for directing a portion of the heated saline water successively through each stage of said multi-stage evaporator type water recovery unit whereby water vapors are formed in each stage thereof, second means for directing the condensate of said power plant system through each stage of said multi-stage water recovery unit for condensing said water vapors by direct contact of said condensate and said water vapors and third means for collecting the condensed water vapors in each stage to provide said make-up water.

13. The combination as in claim 12 wherein said first means is additionally thermal-coupled to said turbine.

14. A steam condensing power plant system according to claim 7 wherein said conduit means for directing a portion of the heated saline water includes a series of further heat exchange means operative to bring said heated saline water into heat exchange relationship with steam from successively higher temperature regions of said turbine.

15. A steam condensing power plant system according to claim 14 wherein said further heat exchange means are provided with interconnections directing steam from the higher temperature heat exchange means to the lower temperature heat exchange means.

16. A combination according to claim 1 wherein said fluid condensing power plant system is a fluid power plant condenser having a first fluid passageway for power plant exhaust fluid and a second fluid passageway for said solution, said conduit means being connected to one end of said second fluid passageway, said further conduit means being connected between the other end of said second fluid passageway and said evaporative recovery system and said still further means being connected between the outlet of said first fluid passageway and said evaporative recovery system.

17. A combination according to claim 16 wherein said evaporative recovery system is a multi-stage flash-type system which achieves evaporation in different stages thereof by subjecting said solution to successively lower pressures in successive stages thereof.

18. A combination according to claim 17 wherein said means for directing condensate through said evaporative recovery system comprises conduit means and pumping means arranged to cause said condensate to pass through condensing zones in successively higher pressure stages of said system.

References Cited
UNITED STATES PATENTS

| | | | | |
|---|---|---|---|---|
| 1,680,752 | 8/1928 | Stein | 60—95 |
| 2,707,239 | 4/1955 | Riehl | 60—95 XR |
| 2,781,640 | 2/1957 | Riehl | 60—95 |
| 2,793,502 | 5/1957 | Riehl | 60—95 |
| 3,237,413 | 3/1966 | Taubert | 60—64 |
| 3,288,685 | 11/1966 | Kemper et al. | 203—26 XR |
| 3,336,747 | 8/1967 | Applebaum et al. | 60—64 |
| 3,352,107 | 11/1967 | Blaskowski | 60—64 |

MARTIN P. SCHWADRON, *Primary Examiner.*

ROBERT R. BUNEVICH, *Assistant Examiner.*

U.S. Cl. X.R.

60—67, 94; 202—185